United States Patent [19]

Harries et al.

[11] 4,206,502
[45] Jun. 3, 1980

[54] SEMICONDUCTOR D.C. CHOPPER CONTROLLERS

[75] Inventors: Philip R. Harries, Blackwood; Malcolm A. Hind, Llangynidr, both of Wales

[73] Assignee: Crompton Electricars Ltd., Tredegar, Wales

[21] Appl. No.: 874,618

[22] Filed: Feb. 2, 1978

Related U.S. Application Data

[63] Continuation-in-part of Ser. No. 804,533, Jun. 8, 1977, abandoned, and Ser. No. 804,539, Jun. 8, 1977, abandoned.

[30] Foreign Application Priority Data

Jun. 9, 1976 [GB] United Kingdom ............... 23935/76
Jun. 9, 1976 [GB] United Kingdom ............... 23936/76

[51] Int. Cl.² ........................................... H02M 7/515
[52] U.S. Cl. .................................... 363/124; 318/811; 307/252 M
[58] Field of Search .................... 318/345 G, 800, 811; 307/252 M; 363/124

[56] References Cited

U.S. PATENT DOCUMENTS

| 3,146,356 | 8/1964 | Kidwell et al. ................. 307/252 M |
| 3,492,557 | 1/1970 | Brown ............................ 318/345 G |

FOREIGN PATENT DOCUMENTS

2435086  2/1975 Fed. Rep. of Germany ........... 363/124

*Primary Examiner*—William M. Shoop
*Attorney, Agent, or Firm*—Howard L. Rose

[57] ABSTRACT

In a d.c. chopper controller having an "ON" controlled rectifier for interrupting a load current and a discharge circuit connected in parallel with the "ON" controlled rectifier, said circuit incorporating a commutating capacitor, an "OFF" controlled rectifier which is arranged to apply voltage formed on the capacitor across the "ON" controlled rectifier in a direction to reverse the current flow therethrough and a charging circuit for the commutating capacitor including a third controlled rectifier connected to a reference source, the improvement comprising operating the controller by means of a control circuit such that a charge for the commutating capacitor is provided at a selectable instant during the period that the "ON" controlled rectifier is conducting. This improvement enables secure commutation irrespective of the interruption rate of the "ON" controlled rectifier or the magnitude of the load current. The reference source can be independent of the load current source thereby enabling a higher voltage to be applied to the commutating capacitor and/or a smaller commutating capacitor or slower "ON" controlled rectifier to be used. In a modified arrangement an additional discharge circuit for the commutating capacitor is provided so that the voltage thereon can be limited before commutation to an optimum operative value. The controller may be used with or without a bypass contactor, and control procedures are provided for safe operation in the latter circumstances.

13 Claims, 5 Drawing Figures

SEMICONDUCTOR D.C. CHOPPER CONTROLLERS

RELATED APPLICATIONS

This application is related to and is a continuation-in-part of copending applications Ser. Nos. 804,533 and 804,539, both filed on the 8th June 1977 and now abandoned.

FIELD OF INVENTION

This invention relates to semiconductor, d.c. chopper controllers, particularly of the type utilising controlled rectifiers to switch a load current.

DESCRIPTION OF PRIOR ART

D.c. chopper controllers utilising silicon-controlled rectifiers have been used to control the operation of battery powered electric drives, particularly those containing traction motors. In such controllers the current from the battery to the load passes through a first controlled rectifier (called herein the "ON" controlled rectifier) by means of which it is periodically interrupted. Current interruption is effected by the removal of the "ON" signal from the control electrode of the rectifier and by applying a current reversing voltage across the main current electrodes thereof. The "ON" signal is subsequently restored to the control electrode to thereby trigger the control rectifier from its non-conduction mode into its conduction mode.

In the normal prior arrangement the said current reversing voltage is formed on a so-called commutating capacitor. The latter is contained in a discharge circuit connected in parallel with the "ON" controlled rectifier. This discharge circuit further comprises a second series connected rectifier, called herein the "OFF" controlled rectifier, by means of which the voltage on the capacitor is applied across the "ON" controlled rectifier. The capacitor is also connected in a branch circuit, called the turnover circuit which is likewise connected in parallel with the "ON" controlled rectifier. The turnover circuit has usually comprises the said commutating capacitor, an inductance and a simple diode type rectifier all connected in series.

The normal arrangement includes a control circuit, usually containing controllable timing means, for controlling the sequential operation of the "ON" and "OFF" controlled rectifiers.

In operation, the control circuit initially triggers the "OFF" controlled rectifier into conduction thereby ensuring that the "ON" controlled rectifier is in its non-conducting mode. This effectively places the commutating capacitor across the battery and load and it charges up substantially to battery voltage. The "ON" controlled rectifier is then triggered into its conduction mode by the control circuit thus allowing load current to flow, and at the same time the capacitor discharges through the turnover circuit and the "ON" controlled rectifier. Because of the presence of the inductance in the turnover circuit, current continues to flow even when the capacitor has discharged, with the consequence that the latter recharges but the voltage now appearing on the capacitor is trapped by the rectifier contained in the turnover circuit. Thereafter this charge is stored until it is required for the purpose of next turning off the "ON" controlled rectifier.

When the controller is required to interrupt the current in the "ON" controlled rectifier the "OFF" controlled rectifier is again turned on by the control circuit so that the voltage appearing on the capacitor as a result of the stored charge appears directly across the "ON" controlled rectifier with a polarity such as to urge a reverse current through it. This has the effect of turning it off. At this point in time the "OFF" controlled rectifier is carrying the load current and the commutating capacitor therefore proceeds to charge in the original direction. When the voltage on the capacitor is equal to the charging voltage, the current through the discharge circuit is reduced to zero and the "OFF" controlled rectifier returns to its non-conduction mode, thereby leaving a remanent charge on capacitor C. In due course, when the "ON" controlled rectifier is restored to its conduction mode the polarity of the charge in the capacitor C is again turned round, that is reversed, and the charge remains stored in capacitor C until the next commutating operation occurs.

It has been observed with these prior circuits that under certain operating conditions the commutating capacitor on recharging has a voltage which is less than the normal operating voltage of the battery. This results from a transient inductive effect occurring in the battery and battery leads, generally referred to herein as "the battery inductive effect". Moreover, the greater the load current the more noticeable this effect becomes; consequently, when the capacitor is next used to turn off the "ON" controlled rectifier, there may not be sufficient stored energy therein to perform properly the required function of turning off the "ON" controlled rectifier.

Various modifications have been proposed in the past which have the function of controlling this battery inductive effect so that the stored charge on the commutating capacitor during an operation of the controller is not reduced to a value corresponding to less than the battery voltage. These modifications have included the substitution for the usual rectifier in the branch circuit of a further controlled rectifier or the alternative connection of the branch circuit including the additional controlled rectifier back to the live terminal of the battery, the said additional controlled rectifier being operated during the period that the "ON" controlled rectifier is non-conducting. With such means, provided the capacitor has large enough capacitance, proper operation of the circuit under most normal running conditions can be expected but considerable cost is incurred in providing a sufficiently large capacitor. Moreover, even when using a suitably sized capacitor to thereby enable normal running, difficulty is encountered when the circuit is operating such that the interruption of current in the "ON" controlled rectifier is of short duration or the interruption rate is of low frequency. This is because the capacitor is required to store its charge during virtually the whole of the "ON" period of the "ON" controlled rectifier and in the said circumstances these periods become lengthy and the charge on the capacitor leaks away, thereby reducing the effective turn-off voltage available. Once the charge on the capacitor has gone or has reduced below the turn-off value, the "ON" controlled rectifier cannot be turned off merely by firing the "OFF" controlled rectifier and an emergency contactor has to be brought into action.

Such a situation may arise for example when the drive is operating in the bypass mode hereafter defined. A prolonged interval passes before the next commutating operation commences and the charge on the capacitor C leaks away and becomes insufficient to provide the required commutation of the "ON" controlled rectifier. The controller must then be closed down completely under an emergency procedure.

The known "bypass" mode may be brought into operation when the controller is delivering full continuous power output and therefore the "ON" controlled rectifier is continuously gated on. In this mode the "ON" controlled rectifier is shorted by means of a contactor so that the load current bypasses the rectifier. This operation reduces the energy loss in the rectifier and therefore effectively extends the effective working range of the drive. Care must be taken, however, to ensure that the contactor does not interrupt the load current otherwise unacceptable arcing will occur.

Operation of prior controllers in the bypass mode has proved difficult because of the aforesaid phenomena in which the charge on the commutating capacitor leaks away during bypass operation.

It is an object of the present invention to provide a novel method of operating a d.c. chopper controller and apparatus therefor whereby an inexpensive commutator capacitor may be used in place of the usually more highly rated capacitor.

It is a further object of the invention to provide a new and useful d.c. chopper controller in which improved bypass operation is obtained.

SUMMARY OF THE INVENTION

To these ends, the present invention proposes an alternative method of capacitive commutation in which the commutating capacitor acquires its final turn-off energy not at the point in the cycle of operation when the battery is recovering from the effect of providing a current pulse to the load but immediately before the commutation of the "ON" controlled rectifier. Difficulties due to leakage of the charge from the commutating capacitor are thereby avoided which factor permits operation of the controller in the bypass mode. The proposed method enables the controller to store a charge on the capacitor corresponding to not less than twice the battery voltage and the controller has a much greater controllable range. Because of the increase in the commutating voltage the size of the capacitor can be reduced, or an "ON" controlled rectifier having a slower turn-off time may be substituted, thereby rendering the controller less expensive.

The invention also provides in a d.c. chopper comprising an "ON" controlled rectifier connected in series with the load and battery so as to provide for interruption of the load current, a discharge circuit connected in parallel with the "ON" controlled rectifier and including a commutating capacitor connected in series with an "OFF" controlled rectifier, the latter being poled so as to permit, when switched on, the passage of current from the capacitor through the "ON" controlled rectifier in the reverse conduction direction thereof and being fired when interruption of the current through the "ON" controlled rectifier is required, a series branch circuit having a first end connected to a junction between the commutating capacitor and the "OFF" controlled rectifier and a second end connected to a potential source, the said series branch circuit comprising a third controlled rectifier, so poled as to permit the passage of current from the potential source through the "ON" controlled rectifier in its conducting direction, and an inductor connected in series with the said third controlled controlled rectifier, the improvement of a control circuit, containing timing means, which controls the firing of the said controlled rectifiers such that the said third controlled rectifier is turned on after the "ON" controlled rectifier has been fired and before the firing of the said "OFF" controlled rectifier.

In a modified arrangement of the circuit according to the invention a fourth controlled rectifier is connected between the battery and the junction of the third controlled rectifier and the series inductance in such a way as to form a discharge circuit for the commutating capacitance in parallel with the "ON" controlled rectifier. This fourth controlled rectifier is operated by the control circuit in a firing sequence with the third and the "OFF" controlled rectifiers such that when the "ON" controlled rectifier is conducting and the controller is required to interrupt the current through the load the fourth controlled rectifier is fired first thereby commencing a discharge of the commutating capacitor, followed by the third controlled rectifier at an interval thereafter which is normally terminated before the voltage on the capacitor begins to turn round and which is computed by the control circuit with reference to the voltage on the capacitor immediately before the fourth controlled rectifier was turned on. Finally the "OFF" controlled rectifier is fired. This arrangement enables the optimum charge to be placed on the commutated capacitor irrespective of any battery inductive effects and, again, irrespective of whether the charge on the capacitor has previously leaked away due to prolonged operation of the controller without interruption of the current.

DESCRIPTION OF THE DRAWINGS

These and other objects, advantages and features of the present invention will hereinafter appear in connection with the accompanying drawings, wherein.

DESCRIPTION OF EMBODIMENTS OF THE INVENTION

Figure 1:
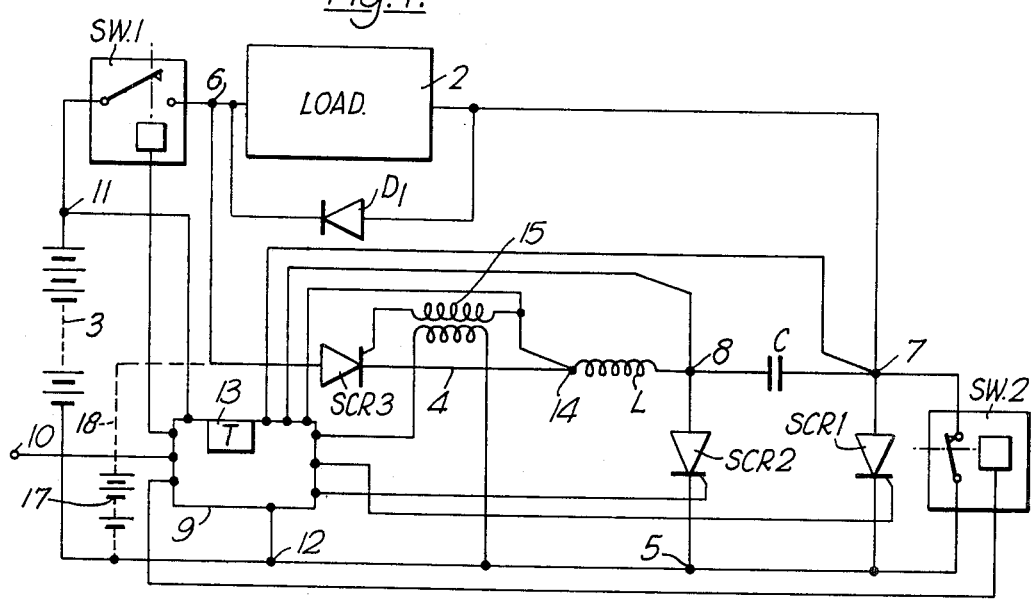
FIG. 1 shows a d.c. chopper controller according to the invention.

In the circuit shown in FIG. 1, a silicon-controlled rectifier SCR1, being the "ON" controlled rectifier, is connected in series with a load 2 which would normally, though not necessarily, comprise a traction motor, a circuit breaker SW1 and an electrical storage battery 3. A diode D1 is connected across the load with such a polarity that current through the load due to self inductive effects may continue to flow when the "ON" controlled rectifier SCR1 is made non-conductive. A discharge circuit comprising in series a commutating capacitor C and a second silicon-controlled rectifier SCR2, being the "OFF" controlled rectifier, is connected in parallel with the "ON" controlled rectifier SCR1 such that the rectifiers have a common cathode terminal 5. Also connected in parallel with the "ON" controlled rectifier is a contactor SW2.

A branch circuit 4 formed in parallel with the load 2, is connected at one end between the junction 6 of the switch SW1 and the load and at the other end between the junction 7 of the load and the "ON" controlled rectifier SCR1. This branch circuit comprises in sequence the said junction 6, a silicon-controlled rectifier SCR3, a junction 14, a choke L, a junction 8, the said commutating capacitor C and the junction 7. Alternatively, instead of being connected to junction 6, the branch circuit may be connected to junction 6, the branch circuit may be connected to an independent voltage source, for example electrical storage battery 17, via a connection 18.

An automatic control circuit 9 having timing means 13 receives inputs from the battery terminals 11 and 12, from a terminal 10 to which a demand signal is applied and from the junctions 7, 8 and 14, to which the commutating capacitor C and choke L are connected. The circuit includes means for operating the circuit breaker SW1 and the contactor SW2, a safety circuit for bringing about the opening of the circuit breaker SW1 in the event of malfunctioning of the controller, respective pulse generators for firing the controlled rectifiers SCR1-3 in a controlled sequence, said generators providing gating signals to the gate electrodes of controlled rectifiers SCR1 and SCR2 and also to the primary winding of pulse transformer 15, the secondary winding of which is connected to the gate electrode of controlled rectifier SCR3, and a phase control means for controlling the firing of the controlled rectifiers SCR2 and SCR3 in time relation to the firing of the "ON" controlled rectifier SCR1. The said timing means provides several timing function as will appear herein from the description with reference to FIGS. 3 to 5.

The circuit of FIG. 1 operates in the following manner.

Assuming that with the "ON" controlled rectifier SCR1 in its non-conducting condition circuit breaker SW1 is closed by the control circuit 9 upon a demand signal appearing at terminal 10 corresponding to less than maximum output. No current will flow in the circuit until the "ON" controlled rectifier SCR1 is gated on. Upon this event, current builds up in the load, and at some time after the gating of "ON" controlled rectifier SCR1, controlled rectifier SCR3 is gated on, thereby causing a flow of current in the said branch circuit 4. This flow of current will be half sinusoidal, eventually reaching zero. When the current ceases the controlled rectifier SCR3 becomes non-conductive and the commutating capacitor C is left with twice the battery voltage V. The "OFF" controlled rectifier SCR2 is now fired so as to commutate the "ON" controlled rectifier SCR1. After the current has become zero in the "ON" controlled rectifier the "OFF" controlled rectifier SCR2 continues to conduct, and the commutating capacitance charges up in the reverse direction. When the voltage on the capacitor C is substantially equal to that of the charging voltage the "OFF" controlled rectifier SCR2 becomes non-conductive. Capacitor C is left charged in the opposite direction and the sequence is repeated at a rate determined by the demand signal.

After the first complete cycle of operation the voltage at the commutating capacitor C is enhanced by the remanent voltage left following commutating, and upon the next gating of the controlled rectifier SCR3 capacitor C will achieve a potential of three or more times the voltage V. This enhanced voltage, which as a consequence of the aforesaid battery inductive effect may considerably exceed the value of three times battery voltage, can be advantageous because it enables the size of the capacitor to be reduced, or alternatively a controlled rectifier with slower turn-off time be used, and therefore the circuit made less expensive. It can also ensure proper commutation in circuits utilising a low battery voltage but if the circuit is operating at farily high voltages (say with battery voltages of 100 volts) the occurrence of a voltage on the commutating capacitor of three of more times the battery voltage may require the use of unnecessarily high voltage rated components, thus causing additional expense. The circuit of FIG. 2 referred to hereinafter proposes a modification of the circuit of FIG. 1 by means of which the voltage upon the commutating capacitor C can be controlled within predetermined limits.

In normal operation, apart from the time when it is required to deliver full power, the controller may be operated in such a way that complete flexibility is provided as to whether the "ON" or the "OFF" period of the "ON" controlled rectifier SCR1, or both periods, are varied in accordance with the demand signal on terminal 10. (This demand signal is a composite signal consisting of the operator demand and various other control demands such as an override current demand.) Should the demand signal be such as to require the controller to deliver full power, the requirement arises for the "ON" controlled rectifier SCR1 to remain continuously in its conductive mode, with the firing of the controlled rectifiers SCR2 and SCR3 suppressed. Under these circumstances it may become advantageous to bypass the "ON" controlled rectifier SCR1 so as to reduce the power loss therein and the bypass contactor SW2 is therefore optionally operated in the course of a fail-safe sequence which ensures that the contactor is not closed at a time when it is unsafe to do so. Once closed, the circuit conditions are continuously monitored to ensure that safe operating conditions prevail. When the power output is to be reduced below the full value a further control sequence obtains to ensure that commutation of the "ON" controlled rectifier is not attempted until the contactor SW2 is opened. In effect the controlled rectifier SCR3 is not fired until the load current is completely restored to the "ON" controlled rectifier SCR1 and current flow through the contacts of the contactor SW2 has ceased. This operation ensures that the charge on the commutating capacitor is not provided at a time when the discharge circuit is likely still to be shorted by the contactor SW2 and the proper commutation of the "ON" controlled rectifier is thereby safeguarded. It furthermore prevents the occurrence of the contactor SW2 breaking the load current.

Thus when a demand for full power is manifest the following sequence determined by the control circuit 9 commences:
1. Timing means 13 commences to time.
2. The pulse rate of the gating signal to the "ON" controlled rectifier SCR1 is automatically increased to a maximum value at a predetermined rate (this avoids motor snatch when the contactor is closed).
3. Upon obtaining the maximum pulse rate the "ON" controlled rectifier is maintained continuously in the "ON" state, no further gating pulses being provided on the gate electrodes of the controlled rectifiers SCR2 and SCR3.
4. The bypass contactor SW2 is now closed. Gating pulses are continuously provided at the maximum rate on the gate electrode of the "ON" controlled rectifier SCR1 to allow for the possibility of failure of the contactor, or of contact bounce occurring therein.

5. During this sequence the voltage drop across the contacts of the contactor SW2 are continuously monitored. If this voltage reduces to an acceptable level before the aforesaid timing means 13 times out, such voltage reduction being indicative of a satisfactory closure of the bypass contactor, then an output from the timing means is disabled and the circuit continues to operate with the contactor SW2 closed. If on the other hand the timing means times out, or other checks indicate unsafe operation, the circuit breaker SW1 is opened.

With the bypass contactor closed and the timing means being disabled, the voltage across the bypass contactor is still continuously monitored and should this rise above the acceptable level for any reason the circuit breaker SW1 is opened. When the demand signal subsequently reduces below the level set for bypass operation the following sequence follows:

6. The timing means 13 commences to time.
7. The bypass contactor is opened whilst at the same time a continuous pulse train at the maximum pulse rate is applied to the gate electrode of the "ON" controlled rectifier SCR1 (this signal having been maintained for the whole of the bypass period). The load current transfers back to the "ON" controlled rectifier and therefore there is little or no arcing across the contacts of the contactor.
8. These gating pulses are maintained for a predetermined period, after which the firing sequence of controlled rectifiers SCR3 and SCR2 commences, the gating pulses are removed from the gate electrode of the "ON" controlled rectifier SCR1. Provided a voltage has reappeared between the contacts of the contactor SW2 within a predetermined period (this being indicative that the contactor has been successfully opened), then an output of the timing means 13 is disabled and the control circuit resumes normal operation.
9. If the timing means output is not disabled as a result of this sequence before it times out, the circuit breaker SW1 is opened. By means of these sequences it is ensured that any malfunctioning of the contactor SW2, whether in failure to close, or failure to open, or the occurrence of a partial open circuit during normal running with the contactor SW2 closed, always causes a fail-safe condition to ensue. Furthermore, erroneous closure of the contacts of the contactor SW2 for more than a brief period at a time when these contacts should be open is interpreted as a failure of the controller to achieve commutation, the circuit breaker SW1 again being opened automatically.

The appropriate portions of these sequences are likewise employed to ensure safe operation of the controller under full load output conditions when the operator elects not to use the bypass contactor facility which he may do by disabling the power supply to the contactor. The means for doing this does not comprise part of the invention and therefore is not described in any further detail herein.

Figure 2:
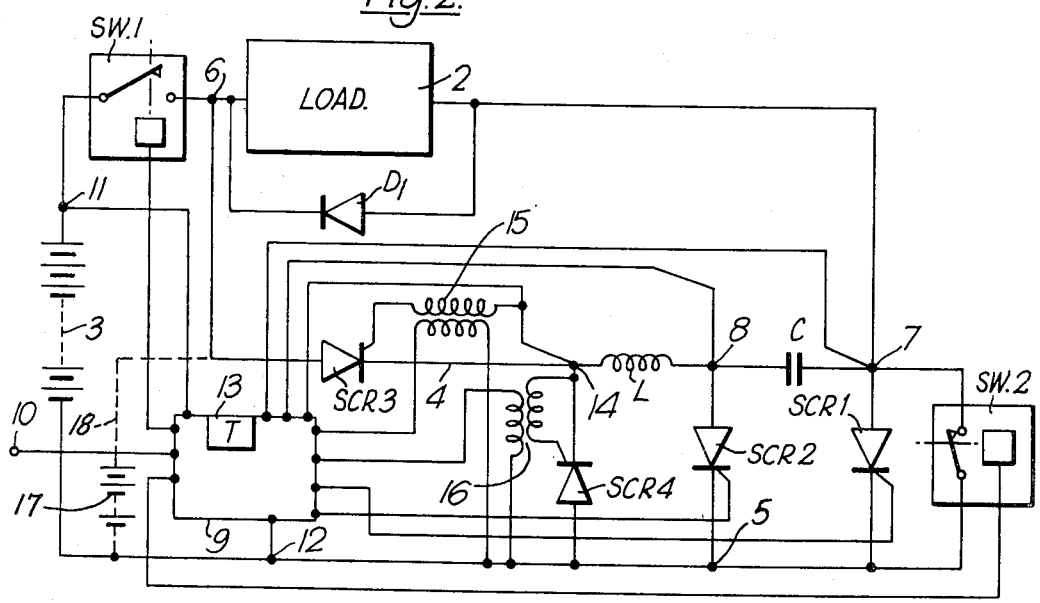
FIG. 2 shows a modification of the circuit of FIG. 1.

Referring now to FIG. 2, the circuit shown is similar to that of FIG. 1 except that a fourth silicon-controlled rectifier SCR4 is provided having its cathode connected to the junction 14 between the third silicon-controlled rectifier SCR3 and the choke L and its anode connector to the common terminal 5. The fourth silicon-controlled rectifier SCR4 has its control electrode connected to receive a gating signal from the secondary winding of a pulse transformer 16, the primary winding of which is connected to a respective pulse generator in the automatic control circuit 9.

The three controlled rectifiers SCR2, SCR3, SCR4 are normally operated in a prescribed sequence at a time when the "ON" controlled rectifier SCR1 is in its conductive state. The sequence commences when it is desired to render the "ON" controlled rectifier SCR1 non-conductive and it commences with the firing of the fourth controlled rectifier SCR4. This completes a discharge circuit for the capacitor C which discharges through the "ON" controlled rectifier SCR1, the fourth controlled rectifier SCR4 which has just been turned on, and the choke L. The third controlled rectifier SCR3 is then gated on. This has the immediate effect of reverse-biasing the fourth controlled rectifier SCR4 and the latter becomes non-conductive. Current now flows from the battery 3 through the third controlled rectifier SCR3, the choke L, the capacitor C, the "ON" controlled rectifier SCR1 and back to the battery. Provided that the moment of firing the third controlled rectifier SCR3 was computed correctly, the voltage left on capacitor C as a result of the aforesaid sequence will be between twice battery voltage and some other value perhaps less than three times battery voltage and this voltage will have a direction such as to cause commutation of the "ON" controlled rectifier SCR1 which is, at this time, still conducting.

At the appropriate moment therefore, after the third controlled rectifier SCR3 has become non-conductive, the "OFF" controlled rectifier SCR2 is fired and capacitor C discharges first into the "ON" controlled rectifier SCR1 to cause the latter to become non-conductive and then through the load and the battery 3. This current continues to flow until the voltage on the capacitor C is equal to that causing the current to flow, at which point the current flow will be reduced to zero and the "OFF" controlled rectifier becomes non-conductive. After a chosen interval conduction through the "ON" controlled rectifier SCR1 is resumed and at a later time the above described process repeats in readiness for the next time that the "ON" controlled rectifier SCR1 is to be turned off.

In the normal event the commencement of the switching sequence referred to above which starts with the fourth controlled rectifier SCR4 being fired would not normally commence until a prescribed short period before the "ON" controlled rectifier SCR1 was to be turned off. This results in that any leakage from the capacitor C as a result of a prolonged period occurring in which the "ON" controlled rectifier is continuously conducting will not hamper the proper operation of the circuit since, even with the capacitor standing at zero charge, it is still possible to cause a charge of twice battery voltage to be restored thereon immediately before firing "OFF" controlled rectifier SCR2 merely by firing the third controlled rectifier SCR3. As the purpose of the fourth controlled rectifier SCR4 is to prevent overvoltage appearing on the commutating capacitor, in the immediate preceding circumstances controlled rectifier SCR3 would be fired either immediately following or concurrently with the fourth controlled rectifier SCR4. If on the other hand, the voltage on the capacitor C at the commencement of the firing sequence was high, then the controlled rectifier SCR3 would be fired at a later interval after the firing of the fourth controlled rectifier SCR4 depending upon the initial magnitude of the voltage on the capacitor C.

It is not necessary that the branch circuit 4 be connected back to the main battery 3. It could instead be connected to the auxiliary source, shown as battery 17 by means of connection 18, particularly in the circumstances referred to in the immediately preceding passage wherein low voltage traction batteries are employed. This auxiliary source may have a terminal voltage which is several times larger than that of the main battery and since its duty is quite low, it need not occupy much space.

If circumstances require, the fourth controlled rectifier SCR4 may be connected back to junction 7 instead of terminal 5. SCR4 is still fired during the period that current is flowing through the "ON" controlled rectifier.

Figure 3:
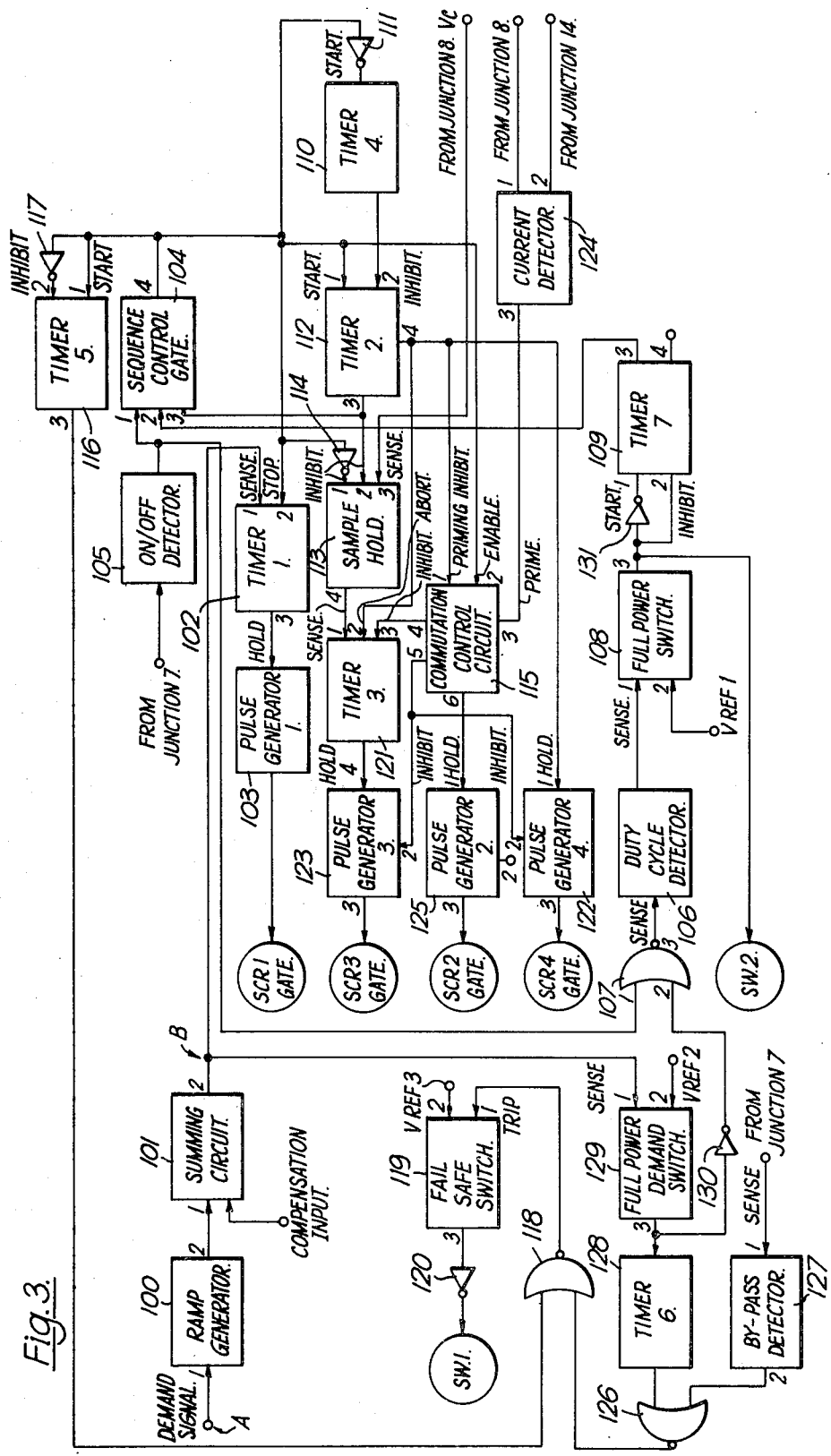
FIG. 3 shows one embodiment of the control circuit of FIGS. 1 and 2.

FIG. 3 shows a preferred form of the automatic control circuit 9. This circuit provides firing pulses through the agency of pulse generators 1-4 for the respective controlled rectifiers SCR1 to 4 in a sequence which is dependent upon an input demand signal labelled therein "V demand" and a signal labelled therein "Vc" which represents the charge on the commutating capacitor C. The signal V demand may represent, for example, the foot pedal depression in a battery operated vehicle and be provided by a pedal-operated potentiometer. In the description which follows, the expressions, in capitals, of ENABLE, STOP, START, HOLD, ABORT and INHIBIT, used with reference to the inputs of the various circuit elements define the function within the respective element resulting from a logic ONE input signal. A more detailed description of the function of the various elements is included later in the specification.

Input signal V demand is connected to a ramp generator 100 which comprises, for example, a Miller integrator with a prescribed slope characteristic which is adjusted to suit operating conditions by selecting the value of the feedback capacitor. Its output is therefore a ramp voltage which levels off at a value proportional to the input and after an interval proportional to the change in input signal. The ramp voltage is fed to the control input of a controllable timer 102, called herein "timer 1", via a summing circuit 101 which receives a compensating signal on its other summing input. The compensating signal is provided by known means, not forming part of the present invention and therefore not described in detail herein, and provides compensation for such conditions as temperature, overcurrent motor drive, overspeed, plugging and other forms of maloperation, etc. The output of timer 1 in the absence of a logic ONE signal on its stop input is a change to a logic ZERO signal at the end of its timing period (TP1) which enables a pulse generator 103. In the presence of a logic ONE input signal the output of timer 1 is a continuous logic ONE signal which inhibits pulse generator 103. The pulse generator 103 has an output which is connected to the gate of the "ON" controlled rectifier SCR1 and provides a stream of firing pulses thereto as long as its input is enabled.

The STOP input of timer 1 is connected through a gate 104, called herein the "sequence control gate," to the output of a voltage level detector 105 called herein the "ON/OFF detector". The input of the ON/OFF detector 105 is connected to junction 7 of the circuits shown in FIGS. 1 and 2 so as to detect the "OFF" condition of the "ON" controlled rectifier SCR1. A second detector 106, called herein a duty cycle detector, is connected to the output of the first said detector via a NOR gate 107 and provides an analog signal which is a function of the duty cycle ratio of the "ON" controlled rectifier SCR1. The duty cycle ratio is compared with a reference signal V REF$_1$ representation of a high value of the said ratio in a comparator 108, called herein "the full power switch", and the output of the comparator is connected to operate the bypass contactor SW2. The output of the full power switch 108 is also coupled via a timer 109 called herein "timer 7" to an input 2 of the sequence control gate 104. Timer 7 is of the type having an output which changes from logic zero to logic ONE at the end of its timing period (TP$_1$). Under normal operating conditions this timer will have timed out and its output will be a logic ONE. Operation of the full power switch 108 resets timer 7 and enables it to start a timing period which will commence when the full power switch returns to its off condition.

The output of the sequence control gate 104, in addition to its connection to timer 1, is also connected to the START input of a timer 110, called herein "timer 4", through an inverter 111, to the START input (1) of a timer 112, called herein "timer 2", to a first INHIBIT input (1) of a sample and hold circuit 113 via an inverter 114, to an ENABLE input (2) of a commutation control circuit 115, to a START input (1) of a timer 116, called herein "timer 5", and also to the INHIBIT input (2) of timer 5 via an inverter 117. The output of timer 5 is connected through an OR gate 118 to a first input (1) of a comparator 119 called herein the fail-safe switch having a second input (2) connected to a voltage reference source, V REF 3, the voltage of which corresponds to logic ONE. The output of the fail-safe switch is connected via an inverter 120 to operate the circuit breaker SW1 of FIGS. 1 and 2.

Timer 2 has an INHIBIT input connected to the output of timer 4, a first output (3) connected to a second INHIBIT input (2) of the sample and hold circuit 113 and to a third input (3) of the sequence control gate 104, and a second output (4) which is the complement of the said first output (3) and which is connected to an ABORT input (2) of a controllable timer 121 called herein "timer 3", to the hold input of the pulse generator 122, called herein "pulse generator 4", and to a PRIMING INHIBIT input (1) of the commutation control circuit 115. The sample and hold circuit 113 has an analog input (3) connected to junction 8 which provides an input signal corresponding to the voltage on the capacitor C and an analog output (4) connected to a control input (1) of timer 3. The output of the latter is connected to a HOLD input of the pulse generator 123, called herein" pulse generator 3".

The commutation control circuit 115 has a third input (3) connected to the output of a current detector 124, a first output (4) connected to an INHIBIT input (3) of timer 3, a second output (5) connected to INHIBIT inputs (2) of pulse generators 3 and 4 and a third output (6) connected to the HOLD input of a pulse generator 125 called herein "pulse generator 2". The said current detector is connected, via junctions 8 and 14 of the circuit shown in FIGS. 1 and 2, across the choke L and provides a logic ZERO signal on its output (3) only when there is zero current flow through the choke. Zero current is determined by testing for voltage change (i.e. disturbance) over a preselected period.

OR gate 118 has a second input connected to the output of a NOR gate 126. To one input of the latter is connected the output of a voltage level detector 127, called herein the "bypass detector", an input of which is connected to junction 7 of the circuit shown in FIGS. 1 and 2. Another input of the NOR gate 126 is provided by a timer 128, called herein "timer 6". The latter has a single input received from a comparator 129, called herein the "full power demand switch", which has a first input (1) connected to the output of the summing circuit 101 and a second input (2) connected to a voltage reference source V REF 2, the voltage of which corresponds with the signal on the output of the summing circuit when there is maximum demand. The output of the full power demand switch is also connected, via an inverter 130, to an input of the NOR gate 107.

DESCRIPTION OF CIRCUIT ELEMENTS

All the elements of the automatic control unit 9 shown in FIG. 3 are either well known or may easily be formed from the specifications given hereinafter. The timing periods given for the timers 1-7 are approximate and may, of course, be varied to suit specific applications of the invention.

TIMERS 1-7

Timer 1 is a controllable timer giving periods between 60 $\mu$sec to infinity and is provided by a conventional circuit configuration incorporating MC 3403 Quad. amplifiers and MC 14001 C. Mos. integrated circuit NOR gates. The requirements for the device are as follows. The timing period commences when the STOP input changes from logic ONE to logic ZERO. Provided the STOP input remains in this state the output changes from logic ONE to logic ZERO at the end (TP1) of the timing period. The restoration of the logic ONE signal on on the STOP input at any time results in the timer resetting and the output returning to the logic ONE level if not already there.

Timers 2, 5 and 7 are all fixed period timers having a well known configuration comprising MC 14001 C. Mos. integrated circuits connected in a resistance-capacity network and having output gates. Typically each has a START input, an INHIBIT Input and at least one output (timer 2 has a pair of complementary outputs). The requirements for these timers are as follows. The INHIBIT input operates only on the output, or outputs, a logic ONE thereon forcing output 3 to a logic ONE and, when provided, output 4 to a logic ZERO. A logic ZERO on the START input also forces output 3 to a logic ONE and output 4 to a logic ZERO and it aborts any timing operation in progress. When the START input goes to logic ONE the timing period commences and providing the START input remains in this state output 3 changes from logic ZERO to logic ONE and output 4 changes from logic ONE to logic ZERO at the end (i.e. TP2, TP5 or TP7), of the timing period. The timing periods are set respectively to $\frac{1}{2}$ millisecond, 15 milliseconds and 300 milliseconds. Timer 3 is a controllable timer formed from a conventional arrangement of MC 3403 Quad. amplifier and MC 14001 C. Mos integrated circuits in a resistance-capacity network. The timing period varies between approximately 0.2 and 1.6 milliseconds. In addition to a control input, timer 3 has an ABORT input (2) and an INHIBIT input (3) which acts only on the output, a logic ONE thereon forcing the output to a logic ONE regardless of all other conditions. This timer has the following requirements. The timing period commences when an ABORT (i.e. logic ZERO) signal is presented to input 2, resulting in the output signal changing from logic ONE to logic ZERO at the end of the timing period provided the signal on input 2 has not returned to the logic ONE level in the meantime. The output reverts to the logic ONE level when an ABORT signal (i.e. logic ONE) is presented to input 2, and if a timing operation is in progress it is aborted.

Timer 4 has a fixed 6 millisec timing period formed from a NE 555 integrated circuit in a resistance capacity network. It has a single input and a single output. The requirements of this unit are that a logic ONE on the input results in the output changing immediately from a logic ZERO state to a logic ONE state and remaining there for the duration of the timing period irrespective of any change at the input in the meantime. At the end of the timing period (TP4) the output returns to a logic ZERO state. A further timing period does not commence until both the input and output are in a logic ZERO state. Timer 6 has a fixed 2 second timing period and is formed from NE 555 and MC 14001 C. Mos NOR gate integrated circuits in a resistance capacity network. It also has a single input and a single output. The requirements are as follows. A logic zero forces the output to a logic ONE state and also aborts any timing operation in progress. A timing operation starts when the input is in a logic ZERO state resulting in the output going to a logic ZERO state at the end (TP6) of the timing period provided the input has remained in the logic ONE state meanwhile. The timer resets when the input is restored to a logic ZERO state.

ON/OFF AND BYPASS DETECTORS (105 and 127)

These are voltage sensitive devices which provide a logic ONE state on their outputs when the voltage on the input exceeds a threshold value. The ON/OFF Detector thereby detects the OFF state of the ON controlled rectifier SCR1 and the Bypass Detector detects that the contacts of the Bypass Contactor are either open or not satisfactorily closed, which conditions result in the respective thresholds being exceeded. The Bypass Detector is set to a lower threshold than the ON/OFF Detector.

CURRENT DETECTOR (124)

This device is similar to the aforesaid detectors. It differs in that the input is floating and an R.C. circuit is incorporated so as to provide for the detection of transient conditions. Thus both a current flow and a current disturbance in the choke L of the circuit of FIG. 1 or FIG. 2 results in the output of the current detector changing from logic zero to logic ONE.

SWITCHES 108, 119 and 129

Basically these are comparators, each providing a logic ONE output when the level of the signal on respective input 1 exceeds the level of the voltage on respective input 2 and a logic zero output when it does not. Since the signal on input 1 of the Fail Safe switch is a logic signal the reference voltage provided on its input 2 is set to provide discrimination against noise in the circuit.

DUTY CYCLE DETECTOR (106)

This provides an analog output signal the value of which is a function of the ratio ON/ON+OFF where ON and OFF refer to the current conduction conditions in the "ON" controlled rectifier SCR1 as detected by ON/OFF detector 105. Zero output corresponds to zero duty cycle and maximum output corresponds to a duty cycle of 100%.

RAMP GENERATOR (100)

This has been sufficiently described in an earlier part of the specification and it is necessary only to mention that the rise and fall of the ramp signals may be at different rates.

PULSE GENERATOR 1 (103)

This is a multivibrator which provides a continuous stream of output firing pulses as long as there is a logic zero condition at its input. When the input is at a logic ONE condition the pulses cease.

PULSE GENERATORS 2, 3 & 4 (122–124)

These are one-shot multivibrators but also have an INHIBIT input (2). With a logic ZERO signal on the INHIBIT input, a logic ZERO on input 1 results in a firing pulse at the output. When input 2 is in a logic ONE state the generator is prevented from responding to a zero state on input 1 and the output remains unchanged. When input 2 has no external connection, as in the case of pulse generator 2 (125), it assumes a condition corresponding to the enabled state of the device.

SAMPLE AND HOLD CIRCUIT (113)

This is a sampling circuit having an analog input (3) and two INHIBIT inputs (142). When neither INHIBIT input is in the logic ONE condition (i.e. both logic ZERO) input (3) drives the output. When there is a logic ONE signal on either or both INHIBIT inputs (1 & 2) the output is held to the value to which it was last driven by input (3).

SEQUENCE CONTROL GATE (104)

This circuit has three logic inputs and a logic output. The requirements are as follows:
(a) When all inputs are at logic ZERO the output is at logic ZERO;
(b) When input (1) is at logic ONE the output is a logic ZERO;
(c) For all other conditions of the inputs the output is a logic ONE.

SUMMING CIRCUIT (101)

This is a standard analog summing circuit.

COMMUTATION CONTROL CIRCUIT

Figure 5:
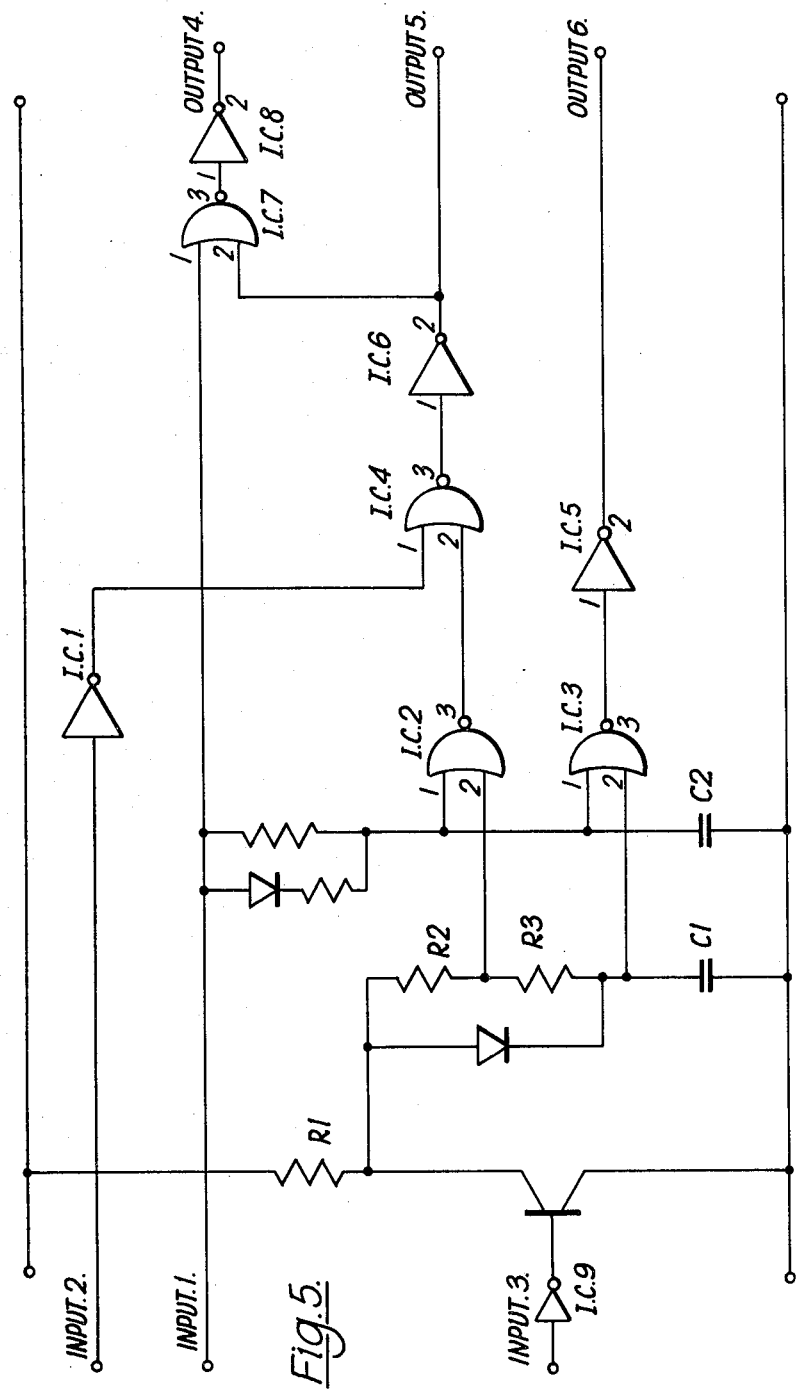
FIG. 5 shows an exemplary form of the commutation control circuit.

This circuit which is illustrated in FIG. 5 has three logic inputs (1–3) and three logic outputs (4–6). It comprises a system of NOR gates (IC's of 2, 3, 4 & 7) and logical inverters (IC's 1, 5, 6, 8 & 9) with R.C. coupled input drives on inputs 1 and 3, one purpose of which is to sequence the changes on the gate inputs, as inputs 1 to 3 are changed, so as to avoid unwanted transient conditions influencing the outputs. The circuit automatically provides a delay in the imposition of logic zero on output 6 relative to a complementary change on output 5, when input three is driven to a logic zero condition which results from the transient voltage decay imposed by the RC circuit R2, C3, C1, this characteristic being required to ensure that inhibits are safely placed on the pulse generators 3 and 4 before pulse generator 2 is enabled.

IC's, 2, 3, 4 and 7 may be provided by the integrated circuit package type MC 14013 - quad two input NOR gates.

IC's 1, 5, 6, 8 and 9 may be provided by the integrated circuit package type MC 14049 - Hex INVERTING BUFFERS.

The following conditions arise sequentially in this circuit as a consequence of the operation of the circuit of FIG. 3, stage 1 corresponding to the OFF condition of SCR1, stage 2 corresponding to the start of the ON period and stage 5 corresponding to the start of the OFF period:

| | Input 1 | Input 2 | Input 3 | Output 4 | Output 5 | Output 6 |
|---|---|---|---|---|---|---|
| Stage 1 | 1 | 0 | 0 | 1 | 1 | 1 |
| Stage 2 | 1 | 1 | 0 | 1 | 0 | 1 |
| Stage 3 | 0 | 1 | 1 | 0 | 0 | 1 |
| Stage 4 | 0 | 1 | 0 | 1 | 1 | 0 |
| Stage 5 (repeat of stage 1) | 1 | 0 | 0 | 1 | 1 | 1 |

OPERATION OF THE AUTOMATIC CONTROL CIRCUIT G

Figure 4:
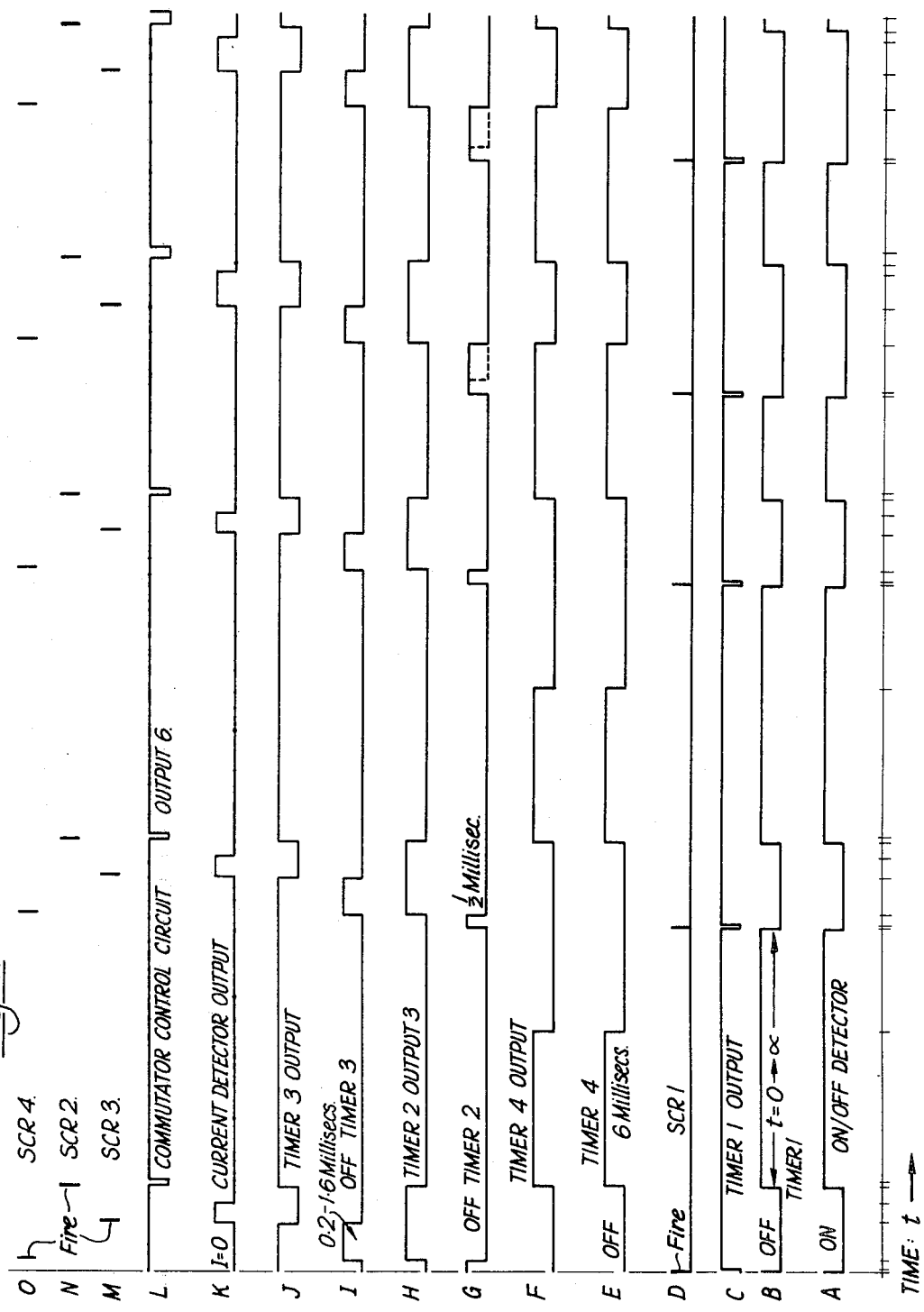
FIG. 4 is a timing diagram showing the operation sequence of the control circuit of FIG. 3

The operation of the control circuit shown in FIG. 3 is described with reference to the timing diagram given in FIG. 4, wherein the letters A to J are used to indicate the operating characteristics of the devices shown in FIG. 3 and the references t0–t36 indicate times at which changes occur in the circuit as indicated.

Timing signal A is the output of the ON/OFF detector (105), logic ONE representing the OFF condition;
Timing signal B is the operating condition of timer 1 (102);
Timing signal C is the output of timer 1 (102);
Timing signal D is the firing pulse connected to the "ON" controlled rectifier SCR1;
Timing signal E is the operating condition of timer 4 (110);
Timing signal F is the output of timer 4 (110);
Timing signal G is the operating condition of timer 2 (112);
Timing signal H is the signal on output 3 of timer 2 (112);
Timing signal I is the operating condition of timer 3 (121);
Timing signal J is the output of timer 3 (121);
Timing signal K is the output of the current detector (124);
Timing signal L is the signal on output 6 of the commutation control circuit;
Timing signal M is the firing pulse connected to the controlled rectifier SCR3;
Timing signal N is the firing pulse connected to the "OFF" controlled rectifier SCR2;
Timing signal O is the firing pulse connected to the controlled rectifier SCR4.

The following should also be noted:
(1) The OFF TIME (TOFF) is the time period in which controlled rectifier SCR1 is in an OFF (BLOCKING) state.
The OFF TIME is the timing period of TIMER 1 (106).
This time period is referred to herein as TP1.
(2) The ON TIME (TON) is the time period in which controlled rectifier SCR1 is in an ON (CONDUCTING) state.

During the mode a operation, referred to hereinafter, the ON TIME is the sum of the following time periods.

TON = (a) TIMER 2 (112) timing period plus (b) TIMER 3 (121) timing period plus (c) The time taken for the voltage disturbance on the communication choke L to die away following the firing of controlled rectifier SCR3.

plus (d) the time delay between placing inhibits on PG3 (123), PG4 (122) and TIMER 3 (121) and the firing of controlled rectifier SCR2.

Periods b and c are both variable, but their sum is fixed within small limits. Therefore TON is regarded as fixed within small limits. This of course only applies during a FIXED ON TIME mode of operation. During the mode b operation, also referred to hereinafter, the time is no longer fixed but is increased beyond the fixed value which it obtains under FIXED ON TIME operation. This is achieved by FREEZING the OFF SEQUENCE at some stage in the operation.

(3) In the description which follows a logic ZERO is defined by a "low" signal and a logic ONE is defined by a "high" signal.

(4) As soon as SCR1 is fired ON, this is detected by the ON/OFF DETECTOR (102) which signals the SEQUENCE CONTROL GATE (103) to change its output to a HIGH STATE. When this happens a sequence of events is initiated which cuminates in SCR1 being commutated back OFF. This sequence of events is referred to herein as the OFF SEQUENCE. The time taken for the OFF SEQUENCE to take place is the ON TIME.

(5) When the timing period of a TIMER is referred to, this is abbreviated to TP followed by the number of the appropriate TIMER. e.g. Timing period for TIMER 6 is called TP6.

(6) Any terminal of a circuit block can be represented by the circuit block number followed by the terminal number. e.g. 102/1 refers to terminal 1 of circuit block 102. This abbreviation sometimes appears hereinafter.

The control circuit has three modes of operation, dependent upon the level of the demand signal (V demand), as follows:

Fixed On-time (Mode a)

In this mode of operation the ON time (TON) is fixed within close limits and a change in duty cycle is achieved by variation in the OFF time (TOFF). Reducing TOFF increases the duty cycle.

Fixed Frequency (Mode b)

In this mode of operation, TOFF is varied but now TON is varied also in order to maintain a fixed frequency of operation, i.e., upon achieving a preset level of operating frequency under mode a operation further reductions in the length of time of TOFF are accompanied by a corresponding increase in the length of time of TON such that TON + TOF remains a fixed time period.

Full Conduction (Mode c)

In this mode of operation, provided a high enough duty cycle has been obtained under Mode b operation, controlled rectifier SCR1 is pulsed at a high frequency and the OFF sequence is prevented from occurring. Thus SCR1 is kept ON continuously and a 100% duty cycle is achieved. The bypass contactor SW2 is automatically energised in this mode, unless disabled.

DETAILED DESCRIPTION OF MODES OF OPERATION

MODE a ("FIXED" ON TIME)

1.1 Assume that a control signal is applied at point A in FIG. 3 which is held at a fixed level, and that no summing inputs are applied to the summing circuit (101), other than the output of the ramp generator (100). Under these conditions the signal at A will also appear at point B.

1.2 Assume also that SCR1 is OFF, thus the output of the ON/OFF detector (105 will be HIGH. The output 4 of the SEQUENCE CONTROL GATE (104) will be LOW, and thus input 2 of TIMER 1 (102) will be in an ENABLE state (i.e. low). The commutating control circuit (115) is in the state corresponding to the aforesaid stage 1.

1.3 Thus to start we have the control signal appearing at input 1 of timer 102, and input 2 of timer 102 is ENABLED. 102 therefore runs for its timing period (which is dependent upon the level of input 1). Note: A low level signal at 102/1, representing for example zero depression of a footswitch, produces a timing period within timer 102 of infinity. A high level signal at 102/1 representing for example maximum depression of a footswitch represents the minimum time period available from 102. In our case ≃ 60 micro seconds.

1.4 Upon completion of the timing period 102/3 changes from HIGH to LOW, thus the input to P.G.1 (103) changes from a HOLD to a FIRE state and a stream of firing pulses are delivered from 103/2 which fire SCR1 ON.

1.5 At this point the ON/OFF detector (105) detects that SCR1 has gone ON and therefore its output drops low. This signal is applied to input 1 of the SEQUENCE CONTROL GATE (104).

1.6. Assume at this point that the other inputs 104/2 and 104/3 are HIGH and LOW respectively. The output of the SEQUENCE CONTROL GATE (104) therefore changes from LOW to HIGH, and the Commutating Control Circuit assumes the state corresponding to the aforesaid stage 2.

1.7 Input 2 of TIMER 1 (102) therefore changes from an ENABLE to an INHIBIT state and consequently the output of TIMER 1 (102) also changes from a LOW to a HIGH, thus the input of PG1 (103) changes from a FIRE to a HOLD state and no further firing pulses are delivered to SCR1 gate. Note: In practice the sequence of events described in 1.4 to 1.7 happens very rapidly and PG1 (103) only has time to deliver one gate firing pulse before it is switched back to its HOLD state.

1.8 When the input of the SEQUENCE CONTROL GATE (104) changes from LOW to HIGH as described in 1.6, then the following events take place simultaneously.

1.8.1 Input 1 of TIMER 2 (112) goes into a START state and TIMER 2 (112) begins timing.

1.8.2 Input 2 of the Commutation Control Circuit (115) goes HIGH, thus output 5 goes into a low state which therefore places input 2 of PG3 (123) and input 2 of PG4 (122) into ENABLE states.

1.8.3 Input 1 of the SAMPLE/HOLD (113) goes into an ENABLE state, and since input 2 is already in an ENABLE state, then the SAMPLE/HOLD (113)

begins to modify its output signal in correspondence to the signal level at its SENSE input 3.

1.9 TIMER 2 (112) then completes its timing period and the following events take place.

1.9.1
  (a) TIMER 2 (112) output 3 changes from LOW to HIGH.
  (b) TIMER 2 (112) output 4 changes from HIGH to LOW. Under (a) Input 2 of the SAMPLE/HOLD (113) goes into an INHIBIT state and therefore its output 4 is HELD fixed. Input 3 of the SEQUENCE CONTROL GATE (104) goes HIGH. (This does not affect the output.)

Under (b)
  (1) Input 1 of the COMMUTATION CONTROL CIRCUIT (115) goes low. Input 2 of TIMER 3 (121) goes to a START state. Momentarily, therefore, outputs 4 and 5 of the COMMUTATION CONTROL CIRCUIT (115) go into INHIBIT states.
  (2) Input 1 of PG4 (122) changes to a FIRE state and thus a gate firing pulse is delivered to SCR4 which turns it on. Any current flowing as a consequence of SCR4 being turned on results in the output of the CURRENT DETECTOR (124) and therefore the input 3 of the COMMUTATION CONTROL CIRCUIT (115) going HIGH. Hence ooututs 4 and 5 of the COMMUTATION CONTROL CIRCUIT (115) go low and output 6 thereof goes high. The latter circuit is now in a condition corresponding to the aforesaid stage 3.

1.9.2 Input 2 of TIMER 3 (121) goes to a START state and since input 3 is ENABLED then TIMER 3 (121) begins to time.

1.10 TIMER 3 (121) times out. The output 4 of TIMER 3 goes LOW, therefore input 1 of PG 3 (123) goes from a HOLD to a FIRE state. This causes a gate firing pulse to be delivered to SCR3 which turns it on.

1.11 The voltage disturbance on the commutation choke which follows the firing of SCR's 3 and 4 has resulted in a high level signal at the input 3 of the COMMUTATION CONTROL CIRCUIT (115). This in effect "primes" i.e. charges up, capacitor C1 of FIG. 5. When the disturbance dies away then 115/3 drops LOW and since C1 thereof was previously PRIMED, the following events happen:

1.11.1 Outputs 4 and 5 of the COMMUTATION CONTROL CIRCUIT (115) are driven high. This immediately places INHIBITS upon TIMER 3 (113) to prevent any further timing and to return PG3 (123) input to a HOLD state, and also places INHIBITS on PG3 (123) and PG4 (122) to prevent any further firing of SCR's 3 and 4.

1.11.2 Very shortly afterwards (to allow the inhibits to establish) output 6 of the COMMUTATION CONTROL CIRCUIT (115) changes from a HOLD to a FIRE state. This causes a gate firing pulse to be delivered to SCR2 which turns it ON. The COMMUTATION CONTROL CIRCUIT (115) is now in a state corresponding to the aforesaid stage 4.

1.12 When SCR2 goes ON, this causes SCR1 to be commutated OFF. This is detected by the ON/OFF detector (105) and therefore its output goes HIGH. This causes the output of the SEQUENCE CONTROL GATE (104) to go LOW and the following events then take place.

1.12.1 Input 1 of TIMER 2 (112) goes to a STOP STATE. This immediately returns its output 3 to a low state (no effect on SEQUENCE CONTROL GATE) which place input 2 of the SAMPLE/HOLD (113) in an INHIBIT state. Output 4 of timer 2 (112) is also immediately changed to a HIGH state. This returns input 1 of PG4 (122) to a HOLD state, input 2 of TIMER 3 (121) to a STOP state, and input 1 of the COMMUTATION CONTROL CIRCUIT (115) to a HIGH state which causes its output 6 to immediately go to a HOLD state (i.e. high) to prevent further firing of SCR2. Also output 4 of the COMMUTATION CONTROL CIRCUIT (115) is held in an INHIBIT state and cannot be driven low by input 2, hence the circuit is in the state corresponding to the aforesaid stages 5 and 1.

1.12.2 Input 2 of the COMMUTATION CONTROL CIRCUIT (115) goes LOW. Also output 4 is held in an INHIBIT state and cannot be driven low by input 1.

1.12.3 Input 2 of TIMER 1 (102) goes to an ENABLE state and thus TIMER 1 (102) begins to time again. This completes a sequence of events under Mode "a" and the sequence then automatically begins again as described in 1.3 to 1.12.

The following events also take place under Mode "a" but were not previously described since they do not affect the sequencing outlined.

2.1 When the ON SCR (SCR1) is conducted off, the output of the SEQUENCE CONTROL GATE (104) goes LOW as described in 1.12. In addition to the events previously described this places the input of TIMER 4 (110) into a START state. This immediately causes the output of TIMER 4 (110) to go HIGH which in turn places input 2 of TIMER 2 (112) into an INHIBIT state. This prevents the outputs of TIMER 2 (112) from changing state (i.e. output 3 held LOW and 4 held HIGH) when TIMER 2 (112) completes a timing sequence. However under Mode "a" operation, TIMER 4 (110) always completes its timing, changes its output back LOW and therefore removes the inhibit from TIMER 2 (112) before the latter has completed its own timing sequence. Under Mode "a" operation therefore, TIMER 4 (110) does not affect the sequence of events described under Mode "a"

2.2 When SCR1 is fired ON as described in 1.4 and 1.5 the output of the SEQUENCE CONTROL GATE (104) goes HIGH which places input 1 and input 2 of TIMER 5 (116) into a START and an ENABLE state respectively. Thus timer 5 (116) begins to time. Its timing period is selected to be greater than the time period for which SCR1 would normally be ON (i.e. greater than TON). If under fault free operation, SCR1 goes OFF before TIME 5 (116) has timed out, then the timing sequence of TIMER 5 (116) is aborted before its output can change. If a fault condition arises, and SCR1 is not turned OFF before TIMER 5 (116) runs out, then the output of TIMER 5 (116) goes HIGH. This HIGH signal is transmitted through the OR gate (118) which places a HIGH signal on input 1 of the FAIL SAFE SWITCH (119). This immediately changes its output to a HIGH state which opens SW1 and removes power from load.

MODE b (FIXED FREQUENCY OPERATION)

In Mode "b" it is assumed that the control signal at B has been increased such that the Timing period (TP1) of TIMER 1 (102) plus the timing period (TP2) of TIMER 2 (112) is now less than the timing period (TP4) of TIMER 4 (110).

i.e. TP1+TP2<TR4

Note: TP1 is varied by the level of the control signal at B. At the instant when SCR2 has been commutated OFF the following conditions prevail (as described in 1.12 to 1.12.3).

3.1 The SEQUENCE CONTROL GATE (104) output is LOW
Thus:
1 Input 1 of TIMER 2 (112) is held in a STOP state
2 Output 3 of TIMER 2 (112) is held in a LOW state
3 Output 4 of TIMER 2 (112) is held in a HIGH state
4 TIMER 3 (121) is held in an INHIBIT state
5 PG3 (123) is held in an INHIBIT state
6 PG4 (112) is held in an INHIBIT state
7 PG2 (125) is held in an INHIBIT state
8 Input 3 of the COMMUTATION CONTROL CIRCUIT (115) does not go HIGH. Also TIMER 1 (102) begins to run, and TIMER 4 (110) begins to run.

3.2 TIMER 1 (102) times out and SCR1 is fired ON.

3.2.1 The ON/OFF DETECTOR (105) senses this and its output drops LOW.

This immediately causes the SEQUENCE CONTROL GATE (104) output to change to a HIGH state which causes the following to happen.
1 TIMER 1 (102) is INHIBITED from running again
2 TIMER 2 (112) begins to time
3 INPUT 2 of the COMMUTATION CONTROL CIRCUIT (115) goes HIGH
4 PG3 (123) goes to an ENABLE state
5 PG4 (122) goes to an ENABLE state
6 The SAMPLE/HOLD (113) begins to modify its output in correspondence with the voltage on the commutation capacitor (These events are all as previously described in 1.7, 1.8.1, 1.8.2 and 1.8.3)

3.2.2. TIMER 2 (112) then completes its timing period, but since TIMER 4 (110) is still running then the outputs of TIMER 2 (112) are not allowed to change. Thus the conditions under 3.2.1 are not altered. Note: Under Mode "a" the events outlined in 1.9.1 take place, which would then have caused SCR3, SCR4 and SCR2 to be fired. This sequence of events if FROZEN until TIMER 4 (110) runs out.

3.2.3 TIMER 4 (110) times out, the INHIBIT is removed from TIMER 2 (112) and the sequence of events as outlined in 1.9.1 take place. Thus mode "b" is the same as mode "a" operation except that the sequence of events is FROZEN for a time period TF which occurs between events 1.9 and 1.9.1.

3.2.4
(1) Under Mode "a" TON is fixed and TOFF is variable
(2) Under Mode "b" TON is increased by an amount TF TF is the amount by which TOFF is less than a pedetermined time period.
Thus if the OFF time is reduced below a preset limit, then the ON time is increased to compensate for this such that TON+TOFF is fixed i.e. fixed frequency operation with variable TON and TOFF.
The duty cycle ratio is still allowed to increase since TON increases whilst TOFF reduces.

MODE c (FULL CONDUCTION)

In this Mode of operation, it is assumed that the control signal at B has increased to a level which would raise the duty cycle above a preset level whereupon a FULL CONDUCTION mode could be entered into smoothly without any large increase in power being delivered to the load.

4.1 The control signal at B is applied to input 1 of FULL POWER DEMAND SWITCH (129). When the signal at input 1 exceeds the reference level at input 2, output 3 switches immediately to a HIGH state. This signal is inverted by the INVERTER (130) and thus a LOW signal is applied to input 2 of the NOR gate (107).

4.2 The output of the ON/OFF detector (105) is producing a series of HIGH and LOW pulses corresponding to SCR1 being switched OFF and ON. This train of pulses is applied to input 1 of the NOR gate (107) and since input 2 thereof is held LOW, then the pulse train is allowed to transmit through to the input of the DUTY CYCLE DETECTOR (106).

4.3 The DUTY CYCLE DETECTOR (106) produces an analog signal at its output which is proportional to the duty cycle of the train of pulses at its input. This signal is then applied to input 1 of the FULL POWER SWITCH (108). If this signal exceeds the reference at input 2 (which it would do under the condition for Mode "c" operation then the output of the FULL POWER SWITCH (108) switches from a LOW state to a HIGH state.

4.4. This HIGH signal then drives input 1 and input 2 of TIMER 7 (109) into STOP and INHIBIT states respectively, input 1 being driven via INVERTER 131. The output of TIMER 7 (109) therefore immediately switches to a LOW state and this LOW signal is applied to input 2 of the SEQUENCE CONTROL GATE (104).

4.5.1 At some stage in the sequence of events SCR1 will be fired back ON and thus the output of the ON/OFF DETECTOR (105) will drop to a LOW.

4.5.2 Since output 3 of TIMER 2 (112) is LOW during TOFF and for a time period TP2 following SCR1 going ON, then as soon as SCR1 goes ON, all inputs (1, 2 and 3) of the SEQUENCE CONTROL GATE (105) will be LOW. The output of the SEQUENCE CONTROL GATE (104) therefore drops to a LOW state.

4.5.3 When this happens the following conditions prevail:

---
(1) Input 1 of TIMER 2 (112) is held in a STOP state
(2) Output 3 of TIMER 2 (112) is held in a LOW state
(3) Output 4 of TIMER 2 (112) is held in a HIGH state
(4) TIMER 3 (121) is held in an INHIBIT state
(5) PG2 (125) is held in an INHIBIT state
(6) PG3 (123) is held in an INHIBIT state
(7) PG4 (122) is held in an INHIBIT P
(8) Input 3 of the COMMUTATION CONTROL CIRCUIT (115) does not go HIGH.
(9) TIMER 4 (110) begins to time.
(10) TIMER 1 (102) begins to time.
---

4.5.4 When TIMER 1 (102) times out it places PG1 (103) into a FIRE state and a continuous stream of gate firing pulses are delivered to SCR1. Therefore although SCR1 is already ON it is continuously fired by PG1 which ensures that it stays ON. Since the ON/OFF DETECTOR (105) had already detected SCR1 ON, its output does not change and therefore the circuit now stays locked in this condition, i.e. the controller is locked into Mode "c" - FULL CONDUCTION.

4.6 When BYPASS contactor SW2 is enabled The sequence of events is exactly as outlined above, with the following additions.

4.6.1 When the output of the FULL POWER DEMAND SWITCH (129) goes HIGH, then input 12 of TIMER 6 (128) goes into a START state and the timer begins to time.

4.6.2 When the output of the FULL POWER SWITCH (108) goes HIGH this switches SW2 which closes across SCR1.

4.6.3 The BYPASS DETECTOR (127), detects when SW2 has closed, and upon doing this its output goes from a LOW to a HIGH state.

4.6.4 If SW2 has not closed before TIMER 6 (128) has completed its timing period, then the output of the BYPASS DETECTOR (127) will still be LOW when the output of TIMER 6 (128) also goes LOW at the end of the timing period. If this situation arises then both inputs of NOR gate (126) will be LOW and its output will go to a HIGH state. This HIGH signal will transmit through the OR gate (118) to input 1 of the FAIL SAFE SWITCH (119). The output of the FAIL SAFE SWITCH (119) will therefore go to a HIGH state which will open SW1 and remove power from the load.

4.7. TRANSITION OUT OF FULL CONDUCTION (back to either Mode "a" or "b") If the controller is in MODE "c" (FULL CONDUCTION) then to return to either MODE "a" or MODE "b" the control signal at B must be reduced below a preset reference level, (i.e. V REF 2). The following events take place.

4.7.1 If the control signal at B which is appearing at input 1 of the FULL POWER DEMAND SWITCH (129) is reduced below the level of V REF 2 (at input 2) then the output of the FULL POWER DEMAND SWITCH (129) will fall to a LOW state.

4.7.2 This LOW signal is inverted by the INVERTER (130) and drives input 2 of the NOR gate (107) to a HIGH state. The output of the NOR gate (107) therefore immediately drops to a LOW state.

4.7.3 In response to this, the output of the DUTY CYCLE DETECTOR (106) also drops to a low value (indicating zero duty cycle).

4.7.4 Thus input 1 of the FULL POWER SWITCH (108) falls below V REF 1 at input 2, and the output of the FULL POWER SWITCH (108) immediately drops to a LOW state. This places input 1 and input 2 of TIMER 7 (109) into START and ENABLE states respectively, and the timer begins to time.

4.7.5 When TIMER 7 (109) completes its timing period, its output changes from a LOW to a HIGH. This HIGH signal is applied to input 2 of the SEQUENCE CONTROL gate (104).

4.7.6 When input 2 of the SEQUENCE CONTROL GATE (104) goes to a HIGH state, then its output goes immediately HIGH, and the conditions as described in 1.7 prevail and the controller enters back into a pulsing mode. (Either MODE "a" or MODE "b" depending upon the level of the control signal at B).

4.8.1 When the output of the FULL POWER DEMAND SWITCH (129) drops to a LOW state, then the output of TIMER 6 (128) goes immediately HIGH, and thus prevents a fail safe condition arising by having both inputs of the NOR gate (126) LOW. This condition would arise when SW2 opens, if enabled, since the output of the BYPASS DETECTOR (127) would drop low.

4.8.2 When the output of the FULL POWER SWITCH (108) drops LOW, this removes the drive to SW2 and SW2 opens. NOTE: TIMER 7 (109) is included so that time period TP7 elapses (following the drive to SW2 being removed) before the SEQUENCE CONTROL GATE (105) is allowed to switch its output to restore the controller to a pulsing mode. This allows SW2 time to open fully, otherwise without this "breathing space" then TIMER 5 (116) would start to run and would complete its run before SW2 had opened, and a fail safe signal would be generated. If the BYPASS CONTACTOR is not fitted at all, then TIMER 7 (109) may be omitted, and the output of the FULL POWER SWITCH (108) is connected via INVERTER (131) to input 2 of the SEQUENCE CONTROL GATE (104). When the BYPASS CONTACTOR SW2 is disabled it is necessary to inhibit Timer 6 from operating, otherwise the Fail Safe switch will operate when Timer 6 times out. This may be achieved by providing Timer 6 with a separate Inhibit input (not shown). The control circuit described hereinbefore with reference to FIGS. 3 and 4 is suitable for use in the circuits of both FIGS. 1 and 2. However, in the interest of economy, as there is no SCR4 in the circuit of FIG. 1 pulse generator 4 (122) can be omitted.

Whilst particular embodiments of the present invention have been described and shown, it should be understood that the controller is capable of modification and variation without departing from the principles of the invention and that the scope thereof should be limited only by the proper scope of the claims appended hereto.

We claim:

1. In a d.c. chopper controller having an "ON" controlled rectifier for interrupting a load current and a discharge circuit connected in parallel with the "ON" controlled rectifier, said discharge circuit comprising a commutating capacitor for switching the "ON" controlled rectifier, an "OFF" controlled rectifier which is arranged to apply voltage formed on the capacitor across the "ON" controlled rectifier in a direction to reverse the current flow therethrough, a charging circuit for the commutating capacitor including third and fourth controlled rectifiers connected to respective reference sources of differing polarity, and a control circuit for automatically controlling the firing of the controlled rectifiers such that they operate cyclically in a predetermined sequence, a method of operating the third and fourth controlled rectifiers comprising the steps of:

(i) gating on the fourth controlled rectifier whilst the "ON" controlled rectifier is conducting load current so as to turn round at least in part any residual charge on the commutating capacitor, and (ii) gating on the third controlled rectifier at a selected instant after the fourth controlled rectifier has been turned on and whilst the "ON" controlled rectifier is conducting whereby the fourth controlled rectifier is biased to its OFF condition and the voltage on the commutator capacitor is adjusted to a level commensurate with the commutation of the "ON" controlled rectifier.

2. The method of claim 1 further comprising the step of connecting the third controlled rectifier to a reference source which is independent of any load current source.

3. In a d.c. chopper controller having an "ON" controlled rectifier for connection between a first terminal of a load and a first terminal of a load battery to provide for interruption of the load current, said load battery having a second terminal connected in series with said load, the combination comprising:
   a capacitative commutating circuit connected in parallel with the said "ON" controlled rectifier,
      said capacitative commutating circuit comprising a commutating capacitor and a series connected "OFF" controlled rectifier, the "OFF" controlled rectifier being poled so as to permit, when switched on, the passage of current from the capacitor through the "ON" controlled rectifier in the reverse conduction direction thereof and being fired when interruption of the current through the "ON" controlled rectifier is required;
   a series branch circuit having a first end connected to a first junction between the commutating capacitor and the "OFF" controlled rectifier and a second end connected to a first potential source, said series branch comprising:
      a third controlled rectifier and an inductor connected in series therewith, said third controlled rectifier being poled so as to permit the passage of current from the potential source through the "ON" controlled rectifier in its conducting direction and being connected between said potential source and a second junction, and said inductor being connected between said first and second junctions;
   a fourth controlled rectifier connected between the said second junction and a second potential source of different polarity to said first potential source, said fourth controlled rectifier being poled so as to conduct current, flowing in the conduction direction of the "ON" controlled rectifier, around the circuit comprising the inductor, the said commutating capacitor, the said "ON" controlled rectifier and the said fourth controlled rectifier; and
   control means for controlling the firing of the said control rectifiers such that the controller operates cyclically, said control means including first and second means,
      said first means for firing the said fourth controlled rectifier at an instant when the "ON" controlled rectifier is conducting and before the firing of the said "OFF" controlled rectifier, and said second means for firing the third controlled rectifier at a selected time after the fourth controlled rectifier has been fired.

4. The d.c. chopper controller of claim 3 wherein the first and second potential sources comprise respectively the said second and first terminals of the load battery.

5. The d.c. chopper controller of claim 3 wherein the said second potential source comprises the said first terminal of the load battery and the first potential source comprising a reference voltage source which is independent of the load battery.

6. The d.c. chopper controller of claim 3 further comprising a controlled switch connected between the said second terminal of the battery and the load.

7. The d.c. chopper controller of claim 6 further comprising a timing means coupled to said control means, said timing means determining a first fail-safe trail period during which a state of continuous conduction of the "ON" controlled rectifier may be established after interrupted operation thereof and a second fail-safe trail period during which a state of interrupted operation of the "ON" controlled rectifier may be established after a period of continuous operation thereof, and said control means causing operation of the controlled switch so as to terminate the flow of current in the load, in the event that the timing means runs out in the first or the second said periods before a respective one of the said two states is established.

8. A d.c. chopper controller comprising:
   an "ON" controlled rectifier for connection between a first terminal of a load and a first terminal of a load battery to provide for interruption of the load current, said load battery having a second terminal connected in series with said load,
   a capacitative commutating circuit connected in parallel with the said "ON" controlled rectifier, said capacitative commutating circuit comprising:
      a commutating capacitor and a series connected "OFF" controlled rectifier, the "OFF" controlled rectifier being poled so as to permit, when switched on, the passage of current from the capacitor through the "ON" controlled rectifier in the reverse conduction direction thereof and being fired when interruption of the current through the "ON" controlled rectifier is required;
   a series branch circuit having a first end connected to a first junction between the commutating capacitor and the "OFF" controlled rectifier and a second end connected to a first potential source, said series branch comprising;
      a third controlled rectifier and an inductor, said third controlled rectifier being poled so as to permit the passage of current from the potential source through the "ON" controlled rectifier in its conducting direction, and being connected between said potential source and a second junction and said inductor means connected between said first and second junctions;
   a fourth controlled rectifier connected between the said second junction and a second potential source of different polarity to said first potential source; said fourth controlled rectifier being poled so as to conduct current, flowing in the conduction direction of the "ON" controlled rectifier, around the circuit comprising the inductor, the said commutating capacitor, the said "ON" controlled rectifier and the said fourth controlled rectifier;
   a bypass contactor connected in parallel with the "ON" controlled rectifier; and
   control means for controlling the operation of the said contactor and the firing of the said controlled rectifiers such that the controller operates cyclically, said control means including first and second means,
      said first means for firing the said fourth controlled rectifier at an instant when the "ON" controlled rectifier is conducting and before the firing of the said "OFF" controlled rectifier and second means for firing the third controlled rectifier at a selected time after the fourth controlled rectifier has been fired;

said control means further comprising;

monitoring means for monitoring the operation of the said contactor, and, contactor operating means providing for operation of the contactor in a fail-safe sequence such that if faulty operation of the contactor is detected the controller is then shut down automatically.

9. The d.c. chopper controller of claim 8 wherein the first and second potential sources comprise respectively the said second and first terminals of the load battery.

10. The d.c. chopper controller of claim 8 wherein the said second potential source comprises said first terminal of the load battery and the first potential source comprises a reference voltage source which is independent of the battery.

11. The d.c. chopper controller of claim 8 further comprising a circuit breaker connected between the said second terminal of the battery and the load and wherein said control means incorporates operating means for said circuit breaker.

12. The d.c. chopper controller of claim 11 wherein said control means further comprises timing means effective to determine a first operating sequence during a first fail-safe trial period during which a state of continuous conduction through the load may be established after the interrupted operation of the "ON" controlled rectifier and a second operating sequence during a second fail-safe trial period during which a state of interrupted conduction of the "ON" controlled rectifier may be established after a period of continuous conduction through the load, said control means causing operation of the circuit breaker so as to terminate the flow of current in the load in the event that the timing means runs out in the first or second said periods before a respective one of the said two states is established.

13. The d.c. chopper controller of claim 11 wherein the first operating sequence comprises the steps of:

(a) operating the timing means so as to establish the said first fail-safe trial period;

(b) gating the "ON" controlled rectifier with a signal comprising a pulse train whose pulse rate automatically increases to a maximum value within the said period;

(c) operating the said bypass contactor so as to establish a short circuit across the "ON" controlled rectifier whilst said gating pulses are continuously provided at the said maximum rate;

(d) monitoring the voltage appearing across the contacts of the said contactor within a predetermined period and disabling the said timing means if a reduction of the said voltage is detected indicative of a successful closing of the said bypass contactor; and the second operating sequence comprises the steps of:

(e) operating the timing means to establish the said second fail-safe trail period;

(f) maintaining a continuous pulse train at the said maximum pulse rate on the gate electrode of the "ON" controlled rectifier;

(g) operating the bypass contactor so as to open its contacts;

(h) monitoring the voltage appearing across the contacts of the said contactor within a predetermined period and disabling the said timing means if an increase in the said voltage is detected indicative of a successful opening of the said bypass contactor and the transfer of the load current to the "ON" controlled rectifier;

(i) reducing the pulse rate of the pulse train provided on the gate electrode of the "ON" controlled rectifier to suit the demand.

* * * * *